US005647602A

United States Patent [19]

Nevin

[11] Patent Number: 5,647,602

[45] Date of Patent: Jul. 15, 1997

[54] HEMI-WHEELED WALKER

[76] Inventor: Monique A. Nevin, 61 Rivercourt Blvd., Toronto, Ontario, Canada, M4J 3A3

[21] Appl. No.: 398,293

[22] Filed: Mar. 3, 1995

[51] Int. Cl.[6] .......................... B62M 1/00

[52] U.S. Cl. .......................... 280/87.021; 280/87.041; 297/5; 135/67; 482/68

[58] Field of Search .......................... 280/87.021, 87.041, 280/40, 39, 641, 651, 652; 297/5, 6; 135/67, 65, 85; 482/66, 68

[56] References Cited

U.S. PATENT DOCUMENTS

| | | | |
|---|---|---|---|
| 2,244,869 | 6/1941 | Everest et al. | 135/47 |
| 2,759,525 | 8/1956 | Ries | 135/67 X |
| 3,350,095 | 10/1967 | Clasen | 272/70.3 |
| 4,700,730 | 10/1987 | Samuelson et al. | 280/87.021 X |
| 4,765,355 | 8/1988 | Kent | 135/67 |
| 4,907,794 | 3/1990 | Rose | 482/68 |
| 4,962,781 | 10/1990 | Kanbar | 135/85 X |
| 5,046,748 | 9/1991 | Oat-Judge | 482/68 X |
| 5,353,824 | 10/1994 | Woods et al. | 297/6 X |

FOREIGN PATENT DOCUMENTS

| | | | |
|---|---|---|---|
| 3025077 | 5/1979 | Australia . | |
| 2267750 | 11/1975 | France . | |
| 0401711 | 9/1924 | Germany | 135/85 |
| 1491561 | 10/1969 | Germany | 482/68 |
| 0219031 | 1/1942 | Switzerland | 135/85 |
| 1342397 | 1/1974 | United Kingdom . | |
| 2074033 | 10/1981 | United Kingdom | 482/68 |
| 8905675 | 6/1989 | WIPO . | |

*Primary Examiner*—Christopher P. Ellis

[57] ABSTRACT

The present invention is a hemi-wheeled walker which is particularly useful with respect to hemiplegics. Patients of this type generally have one strong side of their body and one relatively weak side. Many patients have suffered from a stroke. The hemi-wheeled walker comprises an upright segment having a lower base portion extending parallel to the side of the user, with a handle at an upper portion thereof. The upright segment is a adapted for low force movement across a support surface when the user is supported on his strong side and adapted for gripping engagement with the support surface when the patient requires additional support when he is primarily supported by his weak side. A stabilizing segment is provided to one side of the upright segment and has at least one wheel at a point of contact of the stabilizing segment with the support surface. The stabilizing segment maintains the upright segment in an upright orientation and braces the upright segment against pivotting movement in a direction to the side of the user and towards the stabilizing segment. With this arrangement, the walker is designed to oppose or to minimize the patient falling to his strong side, which would be the tendency when the patient is supported on his weak leg and is moving his strong leg to the next position for walking. The low force movement of the walker across the support surface, when it is not used as a support aid, is highly desirable, as the patient is moving the walker generally with one hand and may otherwise have some difficulty in lifting and repositioning of the walker. It must be appreciated that many patients of this type are recovering and can be at various stages of recovery and often lack confidence. The support aid must be reliable and instill the confidence in the patient.

17 Claims, 4 Drawing Sheets

HEMI-WHEELED WALKER

FIELD OF THE INVENTION

The present invention is directed to walkers for hemiplegics and in particular to hemi walkers which are easily moved by the user and preferably are wheeled.

BACKGROUND OF THE INVENTION

A number of victims of stroke can have the functions to one side of their body seriously reduced while the other side of their body remains quite functional (hemiplegic). To address this specific issue, it has been known to provide a lift and drop type walker where the walker is generally positioned adjacent the patient's strong side of the body. The walker allows the user to balance and provide additional support when he is moving his good leg to the next position. The pick up and placement phase of the walker is a vulnerable time with respect to the user maintaining dynamic balance since the supporting aid must leave contact from the floor, reducing the user's total base support from six point contact to two point contact. Once the strong leg is in position, the walker can then be moved by lifting to the next position and the process continues. It is a slow process, fatiguing due to the weight of the walker (even when fabricated with light weight aluminum) and due to the added expenditure of energy of the normal upper extremity and is therefore suitable for only short distances.

Existing walker arrangements which are located in front of the user are not appropriate for a hemiplegic and use of the same would be quite dangerous.

For a hemiplegic with fairly limited to no functional use of the upper extremity, there is no walking aid that allows them to ambulate and carry out a functional activity at the same time.

SUMMARY OF THE INVENTION

A hemi-wheeled walker according to the present invention comprises an upright segment having a lower base portion extending parallel to the side of a patient with a handle at an upper portion thereof. The upright segment is adapted for low force movement across a support surface when no downward load is applied thereto and adapted for gripping engagement with a support surface when a patient applies a downward support load to the handle. The walker includes a stabilizing segment to one side of the upright segment having at least one wheel at a point of contact of the stabilizing segment with the support surface. The stabliliz-ing segment with the support surface. The stablilizing segment maintains the upright segment in an upright orientation and serves as a brace against pivotting of said upright segment in a direction to the side of the user and towards the stabilizing segment.

According to a preferred aspect of the invention, the lower base portion includes legs disposed in a fore/aft direction relative to the user.

According to yet a further aspect of the invention, each of the two legs includes a glide braker which telescopes relative to the floor gripping members when a downward load is applied to the handle and allows the floor gripping members to engage the floor and provide gripping engagement therewith.

According to yet a further aspect of the invention, the walker includes a basket supported by the upright segment and the stabilizing segment. The carry basket is useful to allow the user to carry other articles as he moves with the walker.

According to yet a further aspect of the invention, the walker includes a support tray positioned below the handle.

According to yet a further aspect of the invention, the support tray is pivotally secured to the walker and movable from a generally vertical storage position to an operating generally horizontal position extending away from the upright segment.

According to yet a further aspect of the invention, the support tray in the storage position is folded upon itself.

The stabilizing segment is preferably pivotally secured to the upright segment and movable between a folded storage position closely adjacent the upright segment and an operating position with the point of contact of the stabilizing segment with a support floor being remote the upright segment.

According to yet a further aspect of the invention, the walker can be provided with locking wheel brakes at the lower end of the upright segment, which are locked unless held in a release position.

According to yet a further aspect of the invention, the stabilizing segment has two downwardly extending legs with freely pivotal wheels at the ends thereof.

According to a preferred embodiment of the invention, the walker is adapted to support a removable basket and is adapted to support a removable tray, each of which allow a user to transport different items with movement of the walker.

According to yet a further aspect of the invention, the walker is preferably of a width of 12 to 15 inches and is preferably of a length in the fore/aft direction of 16 to 20 inches. With this arrangement, a fairly narrow depth of the walker is achieved while providing stability. The narrow depth is important to allow the walker to fit through doorways while still providing support for the user as they move through the doorway.

According to a different aspect of the invention, the hemi-wheeled walker is provided with wheel brakes at the lower ends of the upright segment. In this case, there can be a separate cable brake actuator or other brake actuating arrangement. The wheels can automatically lock if actuated by the cable, or in an alternate structure, the wheels lock in response to a downward patient force and release when the force is removed. It is preferred that a cable type actuator be used, which must be actuated and maintained in the actuating position to place the wheels in a brake position. Again, the walker has the characteristics of the upright segment and the stabilizing segment to one side of the upright segment with the main difference being with respect to the actuation mechanism to achieve a gripping engagement with the floor when the patient uses the walker to provide additional support.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
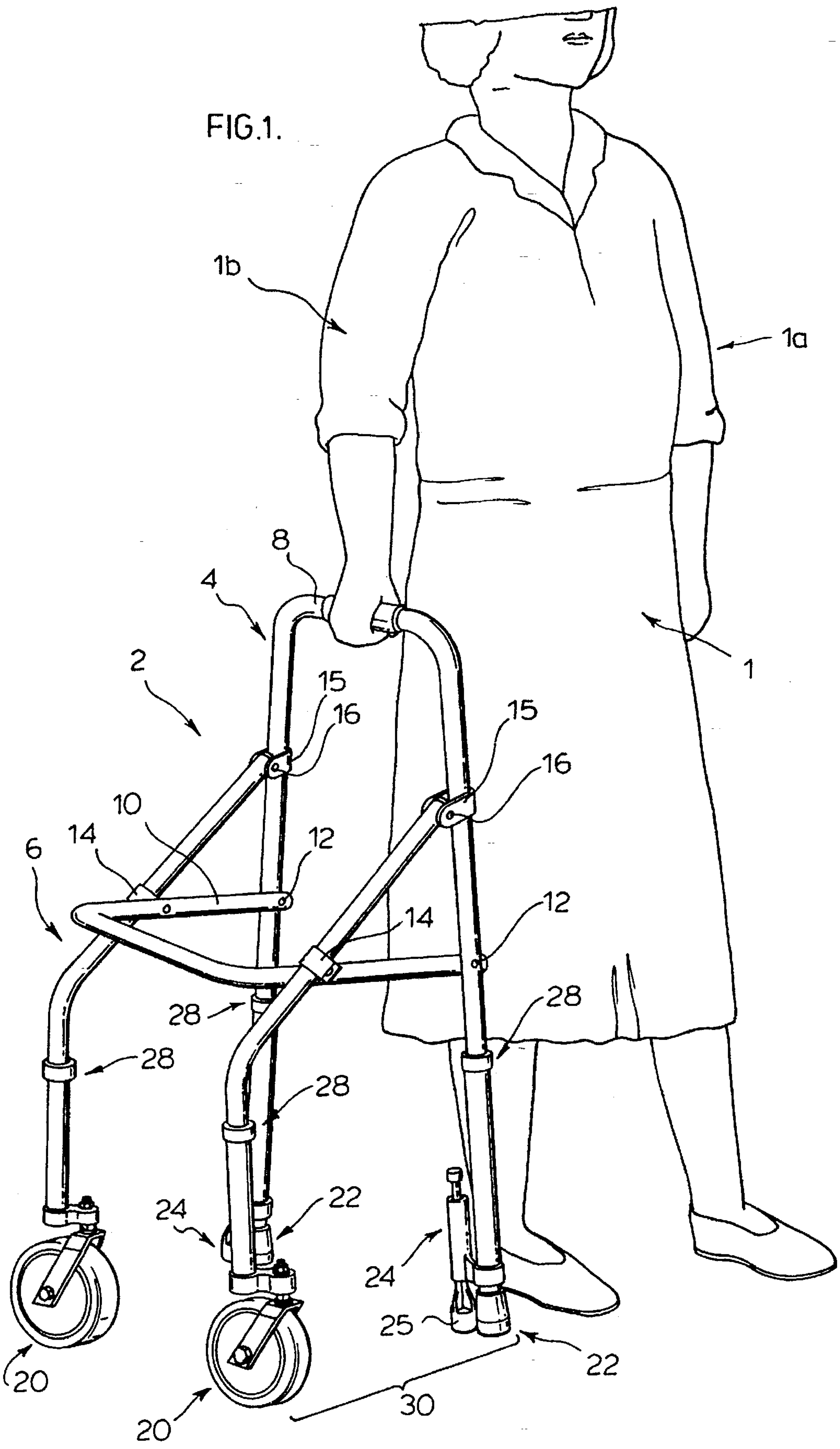
FIG. 1 is a perspective view of a hemi-wheeled walker, according to the present invention.

There are many patients who have suffered from a stroke or other condition, such as multiple sclerosis, brain tumor, brain injury or cerebral palsy, where they lose power to a large extent to one side of their body. These patients are typically referred to as a hemiplegic. The extent of the loss can vary greatly and walking becomes quite difficult in cases of high loss. Many hemiplegics have a very strong or normal side and a permanently weak side with limited use of their leg and very limited to no use of the arm to the weak side of their body.

The hemi-wheeled walker, generally shown as 2, is positioned to one side of the patient 1 and provides a walking and transport aid, as will be more fully described.

The hemi-wheeled walker 2 includes an upright segment 4 in combination with an outbound stabilizing segment 6. The upright segment 4 includes a U-shaped top 8 with a center handle portion which is gripped by the user and extends longitudinally in the fore/aft direction. Typically, the tubular components shown will be made of lightweight aluminum to keep the weight of the device relatively low. The hemi-wheeled walker also includes a brace member, generally shown as 10. In order to allow the walker to collapse for easier transport or storage, the various components can be pivotted. One such pivot is shown at 12 where the brace 10 engages the upright segment 4. The stabilizing segment 6 is pivotally secured at 16 to the brackets 15. Brace member 10 connects with the stabilizing segment 6 by means of slide collars 14 pivotally secured to the brace 10.

The legs of the hemi-wheeled walker 2 include exterior forward and rearward offset pivot wheels 20, which are freely rotatable and easily follow the desired path of the walker. These wheels are connected to the bottom of the stabilizing segment 6. The upright segment 4 at the lower end includes glide brakes 24 which are spring biased such that when no patient weight is exerted on the upright stabilizing segment 4, the low friction caps 25 of the brake ride on the floor with the high friction floor engaging rubber caps 22 at a raised position. This would be the case when the patient is supported on their strong leg and is moving the walker to a forward position. This can easily be accomplished due to the wheels and the low friction engagement of the upright segment 4 with the floor. As a person exerts their weight on the upright segment 4, the glide brakes partially telescope within the sleeve section and the weight is exerted on the rubber caps 22. These provide a nonslip engagement with the support structure. The various lower portions of the upright segment 4 and the stabilizing segment 6 include a leg adjustment collar, generally shown as 28. This allows the walker to be appropriately adjusted for the patient. The dimension 30 of the walker is approximately 12 to 16 inches and although this provides excellent stability in that the walker opposes tumbling outwardly (which would be the anticipated direction of fall of a patient), it still provides a fairly narrow profile to allow the device to pass through doorways and other restricted areas with the patient therebeside. This is important in confined areas, such as an apartment, where the patient can move about the apartment and carry out most of the normal functions with the addition of the walker. Thus, the walker provides additional freedom and independence for the patient.

Figure 2:
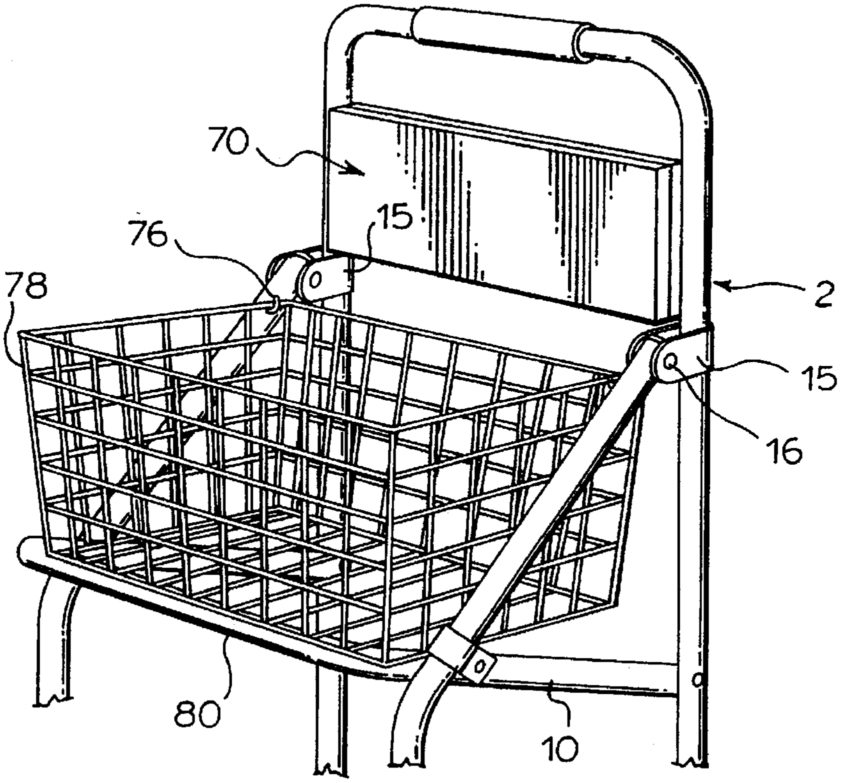
FIG. 2 is a partial perspective view of a hemi-wheeled walker having additional functional elements allowing further use of the walker.
Figure 3:
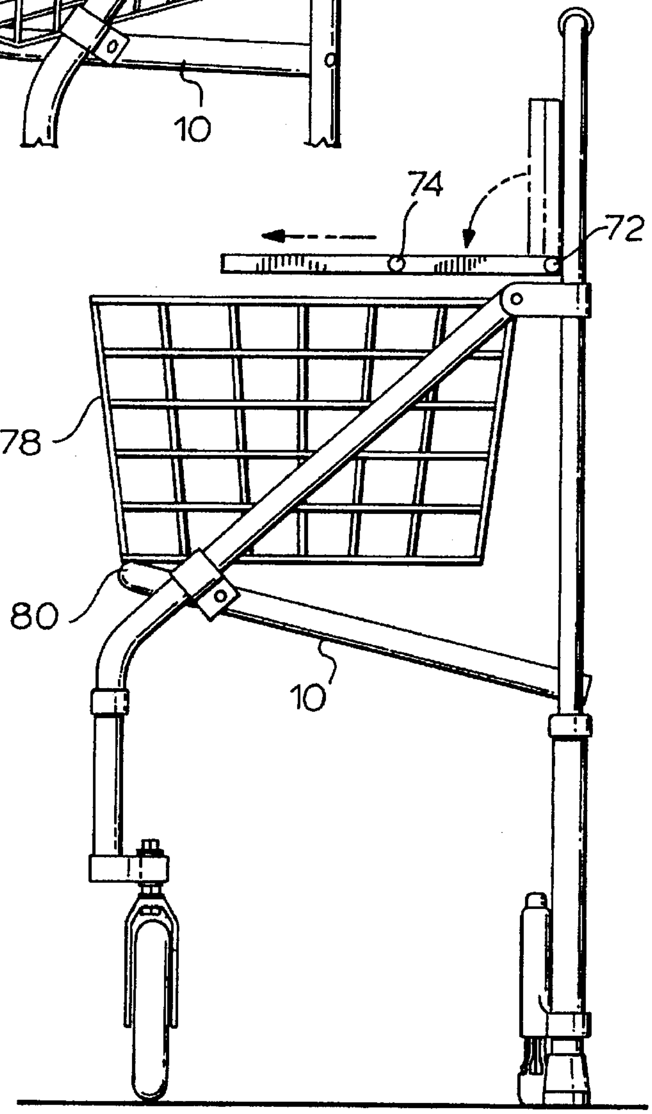
FIG. 3 is an end view showing the walker with a tray supported in a horizontal position and a basket member secured to the walker.

Turning to FIGS. 2 and 3, some additional elements have been added to the walker, namely the fold down tray 70 and the carry basket 78. The fold down tray 70 is pivotally secured to the upright segment 4 and when folded down, will be partially supported by the brackets 15. The tray 70 is preferably of the type used in some aircraft where the tray can fold upon itself. The tray is movable from the collapsed position, generally shown in FIG. 2 to the in use position shown in FIG. 3. It can be seen that the tray has been fully folded out by pivotting of the one half about the pivot 74. It can be appreciated that this position is particularly suitable for receiving a tray or plate upon which the patient can place tray 70. Thus, the walker can additionally support tray 70 and transport the tray with the walker about the apartment or premises. It can also be appreciated that the outer section of the tray need not fold down completely and could be recessed to receive a cup or other small type utensil. This would be suitable for carrying a coffee or other types of beverages.

The basket 78 is secured to the exterior of the walker and intermediate the stabilizing segment 6. The basket rests on the cross member 80 of the brace 10 and is secured adjacent the rear of the basket by means of hooks 76 attached to the stabilizing segment 6. Thus, the basket may easily be placed on the walker and easily removed therefrom. The basket allows the user to place other articles in the basket and then to transport them about the apartment, premises, shopping center, or wherever.

Figure 4:
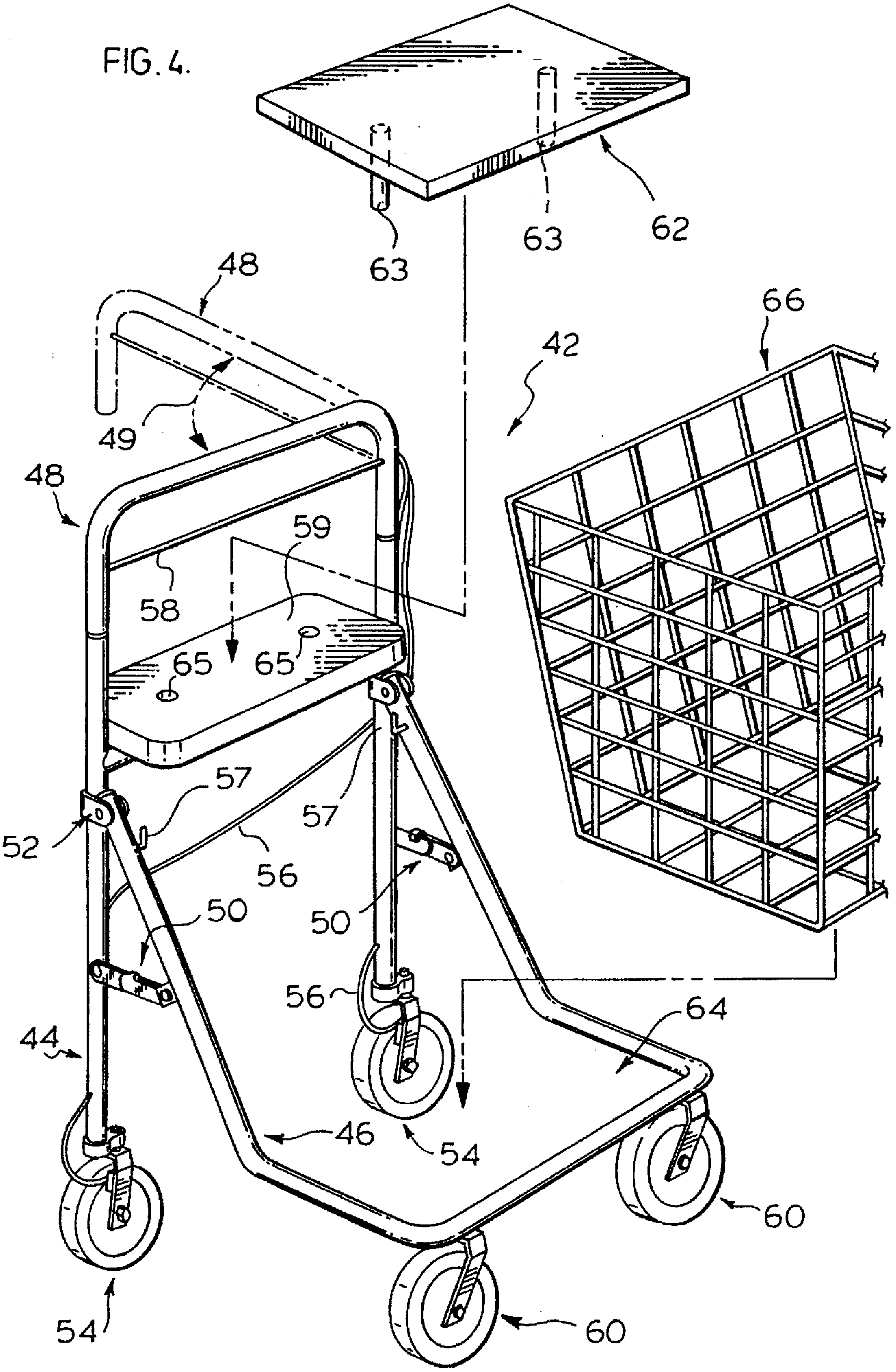
FIG. 4 shows an alternate arrangement of the hemi-wheeled walker.

A further alternate walker is shown in FIG. 4. The alternate hemi-wheeled walker 42 has an upright segment 44, and a stabilizing segment 46, a removable U-shaped handle 48, which can move from the fully engaged position of FIG. 4 to a partially engaged position shown in dotted lines. This position allows the user to use the platform 59 as a seat. This might be particularly useful if the walker is used outdoors or in shopping malls. Typically, the alternate walker of FIG. 4 has braked wheels 54 and a cable release mechanism 58. In the release position, as shown in FIG. 54, the brakes are locked and the inner wheels 54 do not rotate. The outer wheels 60 continue to be free, although these can also include cable locking arrangements, if desired. This walker is more suitable for a patient that only has limited loss of functions to one side of his body.

It can be seen that the handle 48 can be moved around the one leg of the upright portion in a rotary type motion, indicated by 49 and retains part of the walker while exposing the seat.

The alternate walker does include hooks 57 provided on the stabilizing segment 46 for engaging the large carry basket 66. These hooks merely engage the mesh and the front portion of the basket is supported on the flat basket support, generally indicated as 64. This particular walker is suitable where higher carrying loads are desired, such as for carrying laundry or other such items within a premise. This alternate structure includes over the center hinged locking members 50 for positively maintaining the position of the upright segment relative to the stabilizing segment.

The device also includes a tray type surface 62 having downwardly extending engaging members 63 which pass through ports 65 in member 59.

The walker is preferably approximately 16 to 20 inches between the upright members of the upright segment 4 and approximately 12 to 15 inches in width. This provides good stability in the forward and rearward direction as well as very good outward stability. Such a structure can still move through relatively narrow door openings. It must be appreciated that the door frame can also provide support to assist the user in getting the walker through the door.

Figure 5:
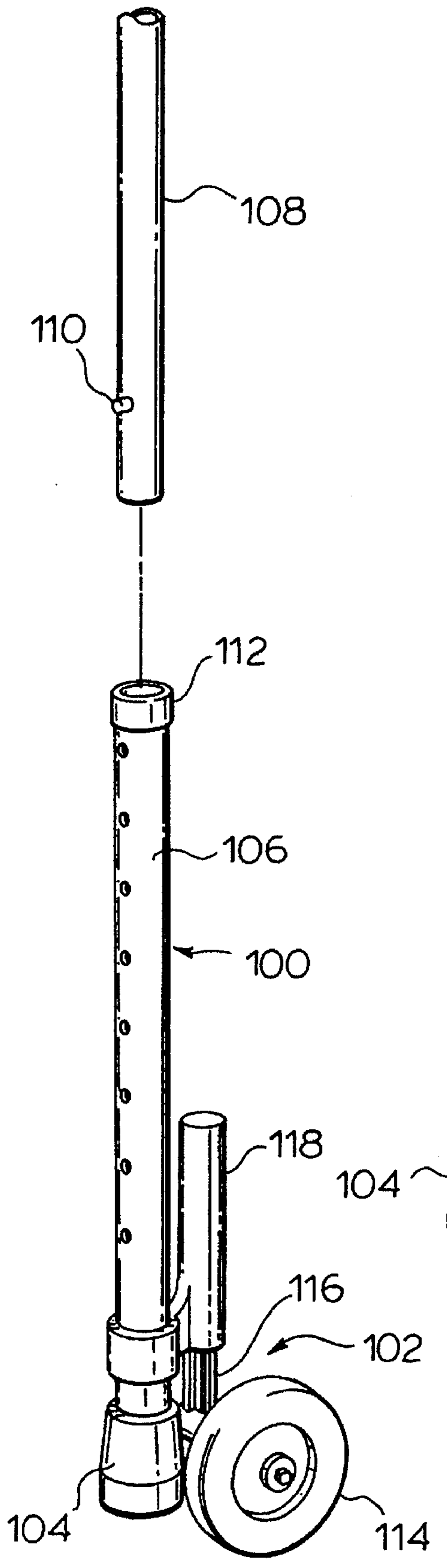
FIGS. 5, 6 and 7 are partial perspective views showing glide or wheel arrangements for allowing easy movement of the walker.
Figure 6:
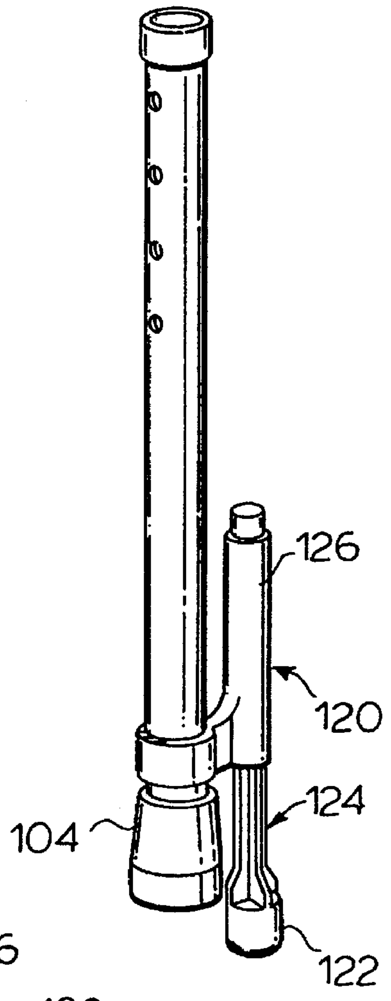
Figure 7:
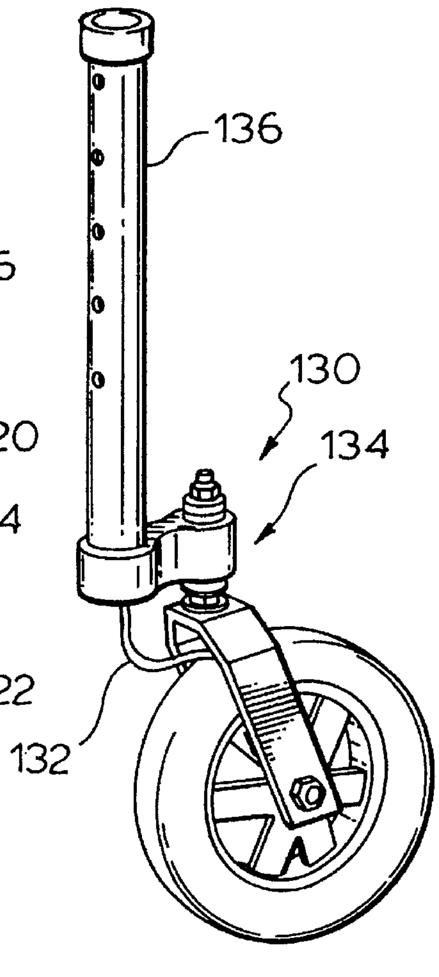

Various leg arrangements are shown in FIGS. 5, 6 and 7. In this case, it can be seen that a wheeled glide wheel 102 of the modified wheeled leg 100 moves vertically when sufficient weight is placed on the leg. In this way, the rubber leg cap 104 engages the floor and stops any further movement of the walker. Thus, it makes it a very stable device while also making it very easy to move when no patient weight is placed on the walker. This is important, as physical strength for many patients is quite limited. It can be seen that the modified wheeled leg 100 has a lower tube 106 into which upper tube 108 telescopes. A locking tab 110 can engage any of the ports in the lower tube. the leg also includes a reinforcing collar 112. The glide brake includes a lower telescopic member 116 which moves within the upper receiving member 118. Typically, there is a spring bias forcing the wheel 114 downwardly, and thus, if no weight is placed on the walker, the rubber leg cap 104 is at a raised position. Similar arrangements are shown in FIGS. 6 and 7. In FIG. 7, the leg includes a glide brake 120 having a low friction material 122 provided at the bottom of the lower telescopic member 124 which is received within the upper receiving member 126. Again, a spring bias urges the rubber cap 104 to a raised position, however, when the patient places weight on the walker, the glide brake moves upwardly and the rubber cap engages the floor. The leg of FIG. 7 has a wheeled brake 130 and a brake cable 132 which serves to lock the wheels. The wheels include an offset pivot 134 to increase mobility.

With this arrangement, the walker is designed to allow the hemiplegic to shift his centre of gravity adequately towards his strong side to maintain his dynamic balance by virtue of the very stable support base of the walker. The wheeled component of the walker allows for a more normal gait pattern with continuous motion of walker and ambulator (user), but with the option of a push-walk sequence using the brake mechanism if a higher component of stability is required, as with a hemiplegic with a lower level of recovery. The wheeled component further allows greater than 2 point ground contact at all times increasing the inherent stability of any other hemiplegic walking aid.

Furthermore, the wheeled component of the walking aid allows for the ambulatory aid to be combined with adaptions such as a tray and a basket to be used as a transport vehicle which enables the user increased independence in activities of daily living. Greater than 50% of hemiplegics following stroke will never recover adequate functional use of the upper extremity. Therefore, independent functional ability along with ease of mobility is greatly enhanced by this assistive device.

From the above, it can be appreciated that other arrangements are possible and the exact leg configuration can change. The hemi-wheeled walker is to be used at the side of the person as opposed to in front of the person and is of a fairly narrow profile. The length of the walker can be somewhat larger to increase stability. Desirably, the hemi-wheeled walker is adapted to allow for carrying of various articles thereon, and thus, increase the capability of the patient in carrying out certain normal functions of daily living. The brakes are automatically applied as a patient exerts a downward force on the walker, but can be set to allow ease of mobility even when carrying certain relatively light loads.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property of privilege is claimed are defined as follows:

1. A walker suitable for a hemiplegic patient comprising an upright segment having a lower base portion extending parallel to the side of a user with a handle at an upper portion of said base and extending in a fore/aft direction relative to the user, said upright segment being adapted for low force movement across a support surface when no downward load is applied thereto and adapted for gripping engagement with a support surface when a patient applies a downward support load to said handle, and a stabilizing segment to one side of said upright segment having at least one wheel at a point of contact of said stabilizing segment with the support surface, said stabilizing segment maintaining said upright segment in an upright orientation and bracing against pivotting of said upright segment in a direction to the side of the user and towards said stabilizing segment and wherein said lower base portion includes two legs disposed in a fore/aft direction relative to the user.

2. A walker as claimed in claim 1 wherein each leg of said lower base portion includes a glide brake which moves relative to floor gripping members when a downward load is applied to said handle.

3. A walker as claimed in claim 2 wherein said walker includes a carry basket supported by said upright segment and said stabilizing segment.

4. A walker as claimed in claim 3 wherein said walker includes a support tray positioned below said handle.

5. A walker as claimed in claim 4 wherein said support tray is pivotally secured to said walker and movable from a generally vertical storage position to an operating generally horizontal position extending away from said upright segment.

6. A walker as claimed in claim 5 wherein said support tray in said storage position is folded upon itself.

7. A walker as claimed in claim 6 wherein said stabilizing segment is pivotally secured to said upright segment and movable between a folded storage position closely adjacent said upright segment and an operating position with the point of contact of said stabilizing segment remote said upright segment.

8. A walker as claimed in claim 1 wherein said legs of said lower base have locking wheel brakes at the lower end thereof which are locked unless held in a release position.

9. A walker as claimed in claim 8 wherein said stabilizing segment has two downwardly extending legs with freely pivotable wheels at the ends thereof.

10. A walker as claimed in claim 5 wherein said walker is adapted to support a removable basket and is adapted to support a removable tray each of which allow a user to transport different items.

11. A walker as claimed in claim 10 wherein said walker is less than 16 inches in width and said upright segment has support points with a fore/aft separation of about 20 inches.

12. A walker for a hemiplegic patient comprising an upright segment having a lower base portion extending parallel to the side of a user with a handle at an upper portion thereof, said upright segment being adapted for low force movement across a support surface when no downward load is applied thereto and adapted for gripping engagement with a support surface when a patient uses the walker for support by applying a downward load to said handle, and a stabilizing segment to one side of said upright segment having at least one point of contact of said stabilizing segment with the support surface, said stabilizing segment maintaining said upright segment in an upright orientation and bracing against pivotting of said upright segment in a direction to the side of the user and towards said stabilizing segment, and wherein said walker includes at least one rolling contact with the support surface to ease manoeuvrability of said walker when no support load is applied thereto and wherein said lower base portion includes two legs disposed in a fore/aft direction relative to the user.

13. A walker as claimed in claim 12 wherein each leg includes a glide brake which moves relative to floor gripping members when a downward load is applied to said handle allowing said floor gripping members to engage the support surface.

14. A walker as claimed in claim 12 wherein said walker includes a carry basket supported by said upright segment and said stabilizing segment.

15. A walker as claimed in claim 12 wherein said walker includes a support tray positioned below said handle and said handle extends in the fore/aft direction and said walker is collapsible to a storage position.

16. A walker as claimed in claim 12 wherein said upright segment has wheels at a lower position thereof engaging a support surface and a brake arrangement for selectively braking said wheels against movement.

17. A walker as claimed in claim 12 wherein said handle is pivotally secured and movable from an operating position aligned with the fore/aft direction of the walker to a dear position allowing access to a seat secured at an upper portion of the walker, said seat being located beneath said handle when said handle is positioned in said operating position.

* * * * *